May 22, 1962 J. F. SOARES ETAL 3,035,729
FODDER DISTRIBUTING WAGON
Filed Dec. 26, 1958 6 Sheets-Sheet 1

INVENTORS.
JOE F. SOARES
LEONEL V. ALVES
BY
ATTORNEY

May 22, 1962 J. F. SOARES ETAL 3,035,729
FODDER DISTRIBUTING WAGON
Filed Dec. 26, 1958 6 Sheets-Sheet 5
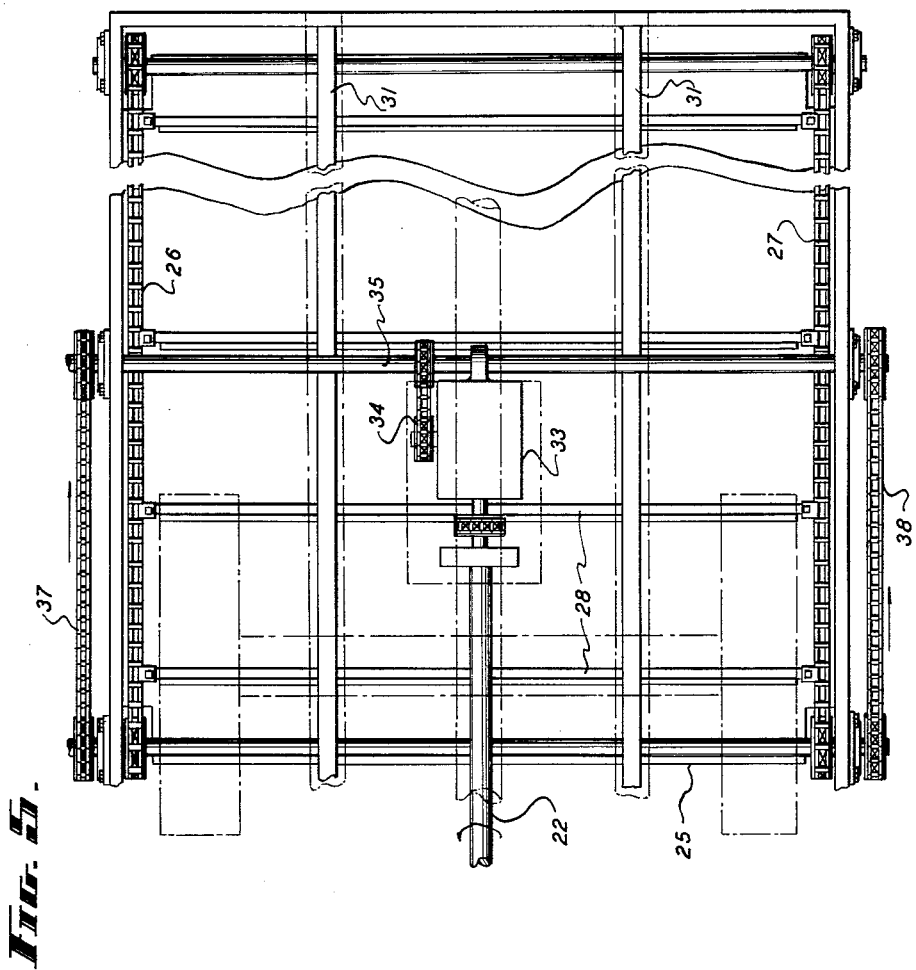
Fig. 5.
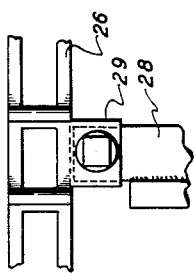
Fig. 6.
INVENTORS.
JOE F. SOARES
LEONEL V. ALVES
BY 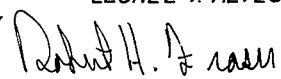
ATTORNEY

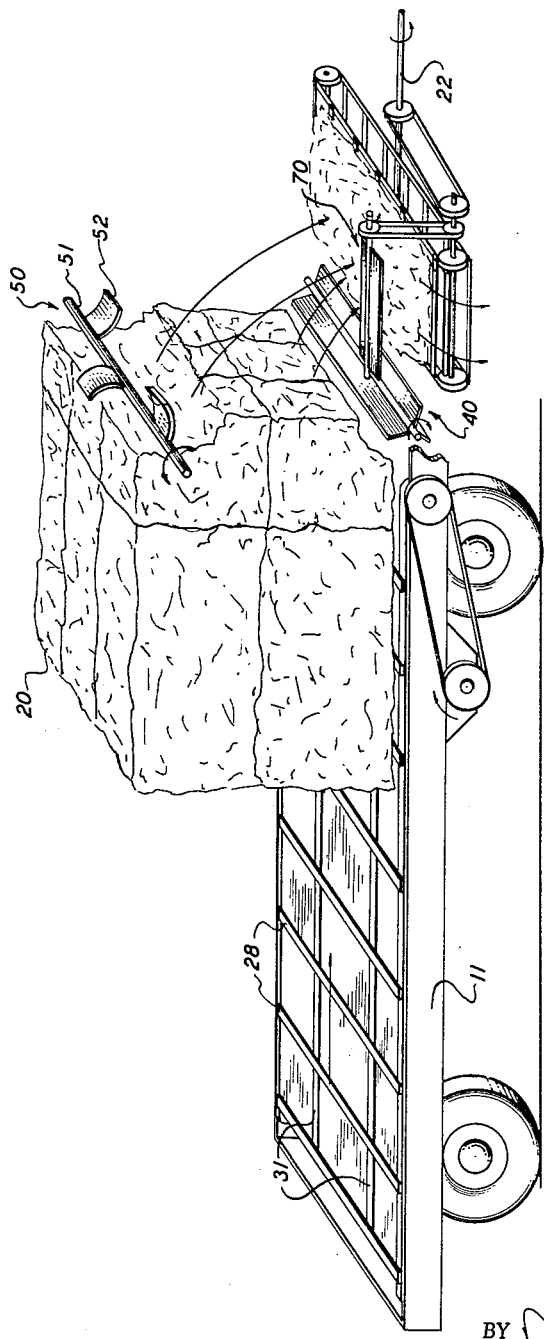

United States Patent Office 3,035,729
Patented May 22, 1962

3,035,729
FODDER DISTRIBUTING WAGON
Joe F. Soares, Artesia, Calif., and Leonel V. Alves, 4525 Eucalyptus, Chino, Calif.; said Soares assignor to said Alves
Filed Dec. 26, 1958, Ser. No. 783,037
2 Claims. (Cl. 214—519)

This invention relates to implements for dispensing livestock feed, and particularly to apparatus for providing an even distribution of livestock feed which is originally in baled form.

The most convenient way to store and maintain fodder for livestock, particularly dairy cattle, is to bale the fodder together. When it becomes necessary to distribute the fodder, however, as in a large dairy installation, the problems of breaking up the bales and distributing the fodder evenly can require a great deal of work. It may be desired, for example, to use the technique of laying the fodder along a fence through which the cattle can feed. This is particularly desirable in extremely large installations where systematic feeding procedures are required. In breaking up the bales, however, it has heretofore been necessary to use manual methods. Such techniques are practically always costly and slow. Furthermore, once broken up, the fodder in the bales becomes difficult to manage in large quantities so that distributing the fodder evenly at the desired points is made even more difficult.

It is particularly desirable that in large installations, such as modern dairy farms, there be some ready means of handling baled fodder, breaking it up, and distributing it evenly at desired points in an efficient manner.

It is therefore an object of this invention to provide an implement for breaking up baled fodder and distributing it evenly.

Another object of this invention is to provide a system for smoothly and continuously discharging fodder at specific points.

Yet another object of this invention is to provide an improved feed distribution system, which can receive baled fodder, break the fodder up, and distribute it at a controlled rate at desired locations.

These and other objects of this invention are achieved by an arrangement in accordance with the invention which utilizes a wheeled wagon comprising a longitudinal conveyor moving in the direction of the wagon, and an auxiliary transverse conveyor positioned at the forward end of the longitudinal conveyor. The longitudinal conveyor provides a loading and storage surface for baled fodder, and in movement supplies this fodder to its forward end. At the forward end, the bales move into contact with at least one beater, which breaks up the bales and dispenses the shredded fodder upon the transverse conveyor. The transverse conveyor continuously moves the fodder to one side of the wagon and discharges it upon the ground. A metering device positioned above the discharge point on the transverse conveyor and moving oppositely to the direction of movement of the shredded fodder keeps the flow of fodder substantially constant. All of these operative devices are driven together from a single source of power, and all move synchronously to achieve a controlled fodder discharge rate.

A better understanding of the invention may be had from a reading of the following detailed description and an inspection of the drawings, in which like reference numerals refer to like parts, and in which:

FIG. 5 is a bottom view of a portion of the wagon of FIG. 1, showing details of the drive mechanism;

FIG. 6 is a fragmentary view of a portion of the drive mechanism which is employed in the conveyors of the wagon; and FIG. 7 is a simplified perspective view of the operative and physical relationships of the principal moving portions of the wagon.

Figure 2:
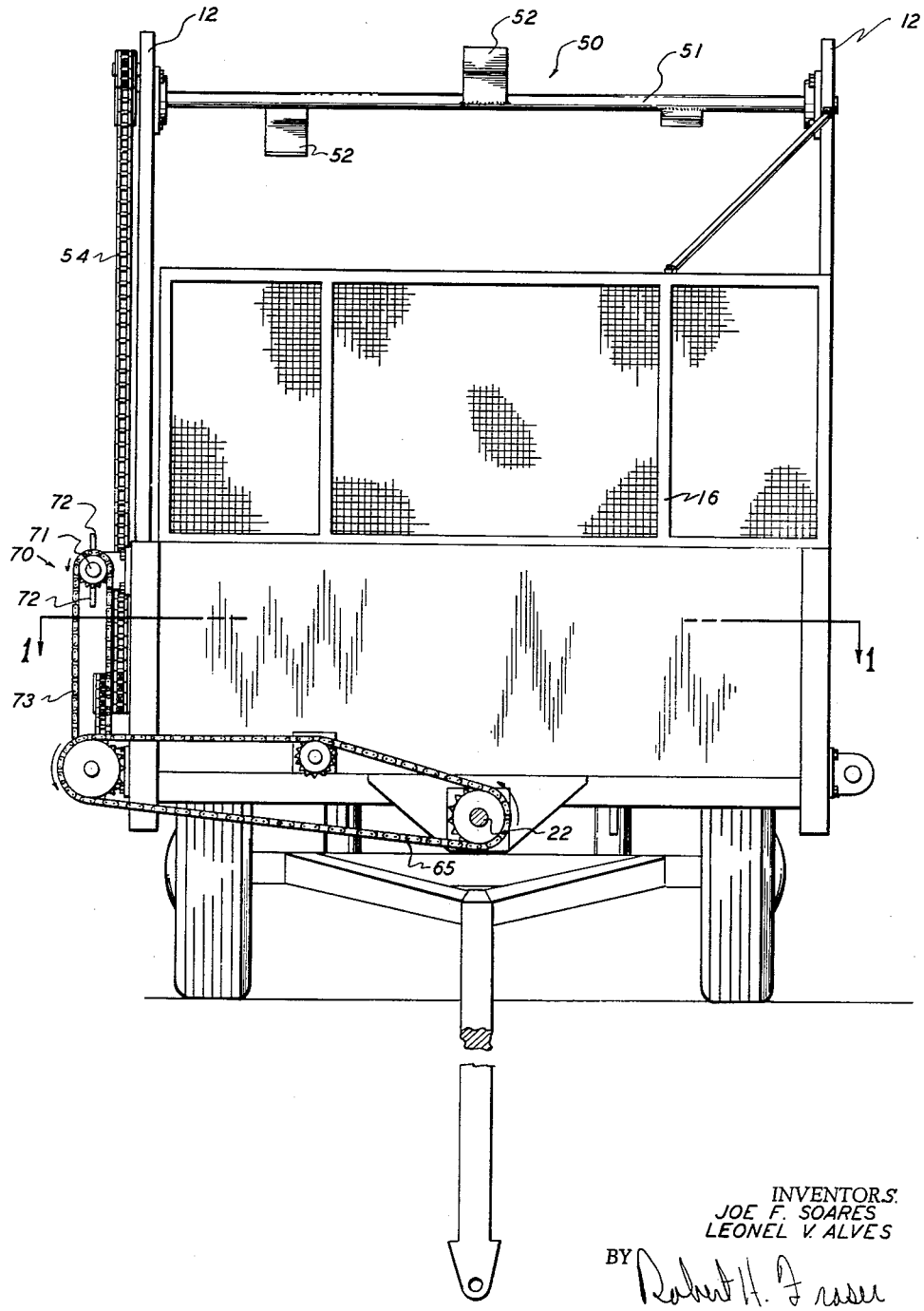
FIG. 2 is a front view of the wagon of FIG. 1.

A feeding wagon in accordance with the invention, referring now to the drawings, has a main body frame 10 which includes a principal body portion 11. The main body frame 10, best seen in FIG. 3, will be hereafter referred to as having a longitudinal axis extending along the direction of elongation of the principal body portion 11, and a forward end, which will be taken to be the front end of the wagon as it moves in its conventional direction of operation (toward the left in FIG. 3). The main body frame 10 also includes vertical risers 12 extending upward at the forward end of the principal body portion 11, and an auxiliary body extension 13 at the forward end and below the principal body portion 11. The vertical risers 12 extend separately from the left and right hand sides of the forward end of the principal body portion 11, these terms here being used relative ot an observer looking forward along the wagon in its direction of movement. The vertical risers 12 and the auxiliary body extension 13 are both fixed firmly to the principal body portion 11. The body of the wagon also includes a left side screen 15 (best seen in FIG. 3) coupled to the left vertical riser 12, and a front screen and panel section 16 (best seen in FIG. 2) coupled to the left side screen 15 and to the auxiliary body extension 13. The main body frame 10 is mounted on wheels 18 through associated axles and support means which are not shown in detail. The wagon may be pulled along the wheels 18 by a tongue 19 coupled to an associated tractor or other source of motive power (not shown). The tongue 19 and wheels 18 are best seen in the views of FIGS. 2 and 3.

Figure 3:
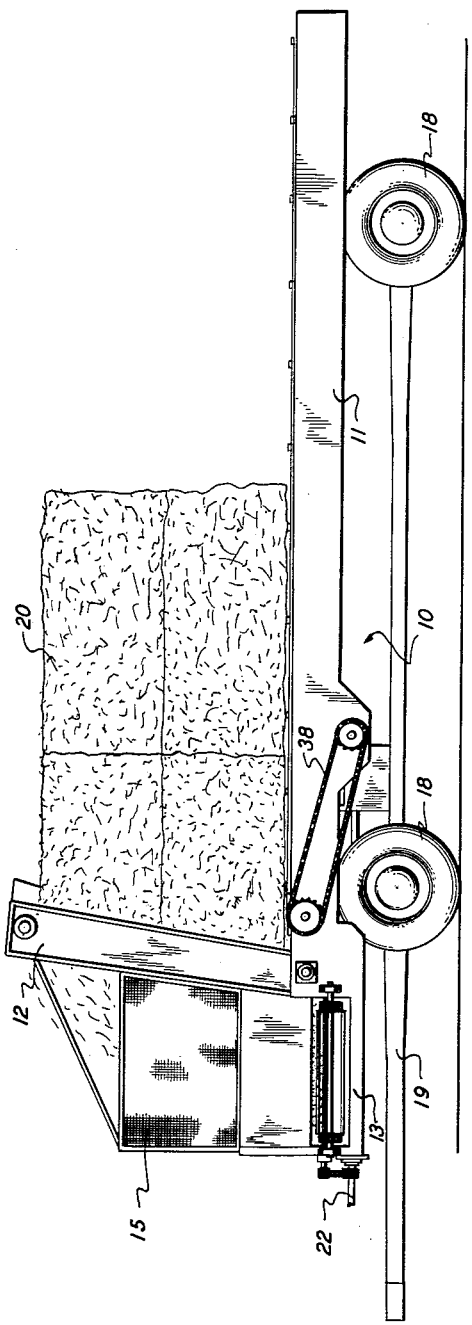
FIG. 3 is a side elevational view of the left side of the wagon of FIG. 1.

Thus, it may be noted that the principal body portion 11 of the wagon provides a large surface for the support of baled fodder 20, as may be seen in FIG. 3. The dimensions of the wagon with respect to the bales 20 are preferably such that the bales may be stacked two high, with several lengths being accommodated along the principal body portion 11. In the present example, it is desired that the fodder be discharged at the right front side of the wagon, so that the right front side will hereafter be referred to as the feed discharge side of the wagon.

Driving power for the various operative portions of the wagon may be provided via a drive shaft 22 which may be coupled to a power takeoff mechanism of a conventional tractor (not shown).

Figure 1:
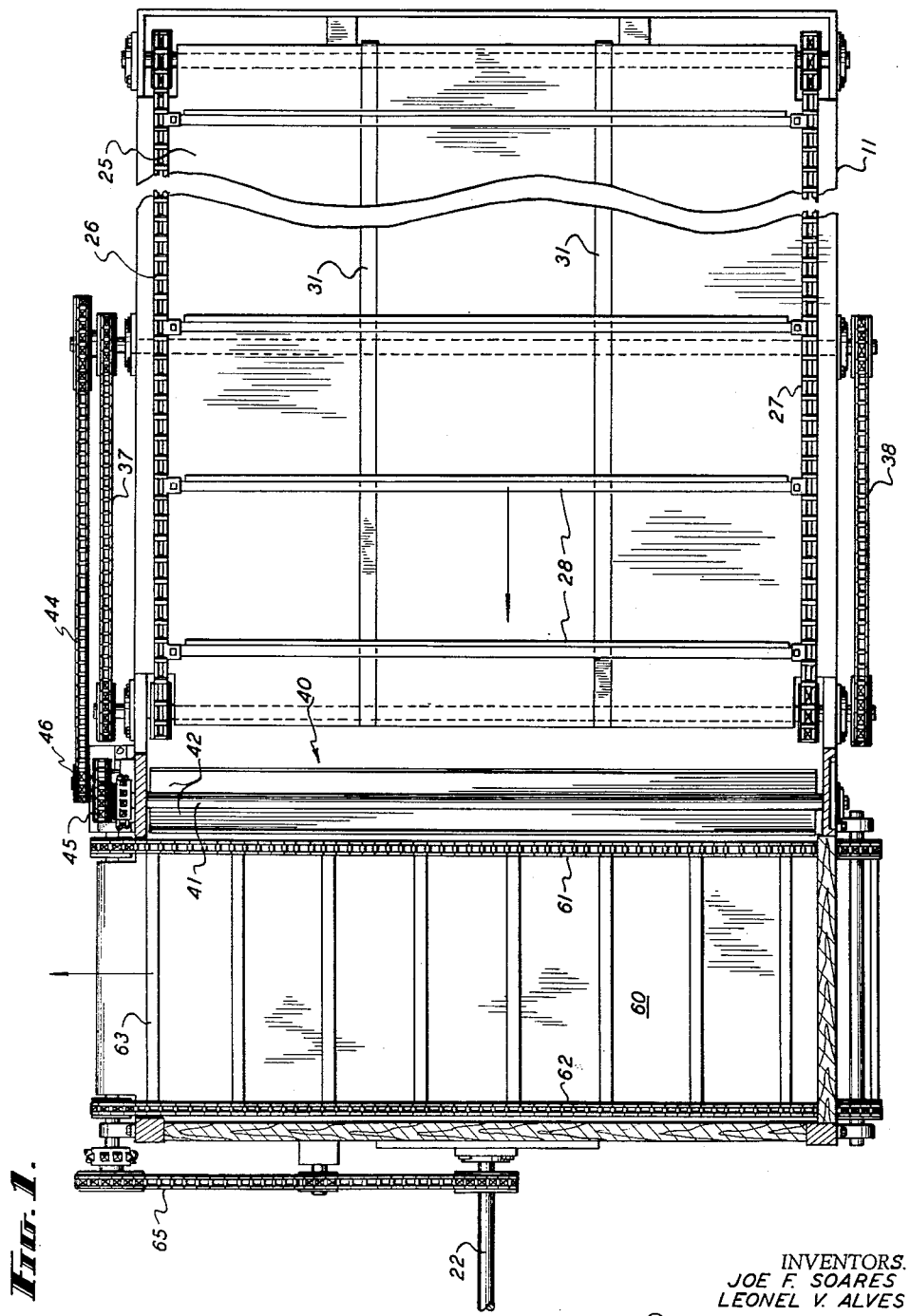
FIG. 1 is a plan view of a fodder distributing wagon in accordance with the invention, some of the details of which have been omitted for clarity.

The principal body portion 11 of the feeding wagon consists of a planar structure, the surfaces of which define a wagon bed 25. Together with the wagon bed 25, there is provided a longitudinal conveyor consisting of a pair of endless drive chains 26 and 27, each running longitudinally along and on a different side of the wagon bed 25, and a number of substantially equally spaced transverse conveyor bars 28 which extend between and are coupled to the different drive chains 26 and 27. As may be seen in detail in FIG. 6, this coupling is made by joining the conveyor bars 27 to tabs 29 extending from the drive chains 26 or 27. Thus, the operation of the links of the drive chains 26 or 27 is not affected. Each of the drive chains 26 and 27 runs between sprockets disposed at the front and back ends of the wagon bed 25, so that the conveyor bars 28 traverse an endless path about the wagon bed 25. Longitudinal rails 31 are inset into the surfaces of the wagon bed 25 at two different points on the top and bottom surfaces to provide frictional surfaces for the conveyor bars 28 and greater strength for the wagon bed 25. These details are best seen in the plan and bottom views of FIGS. 1 and 5, respectively.

Figure 4:
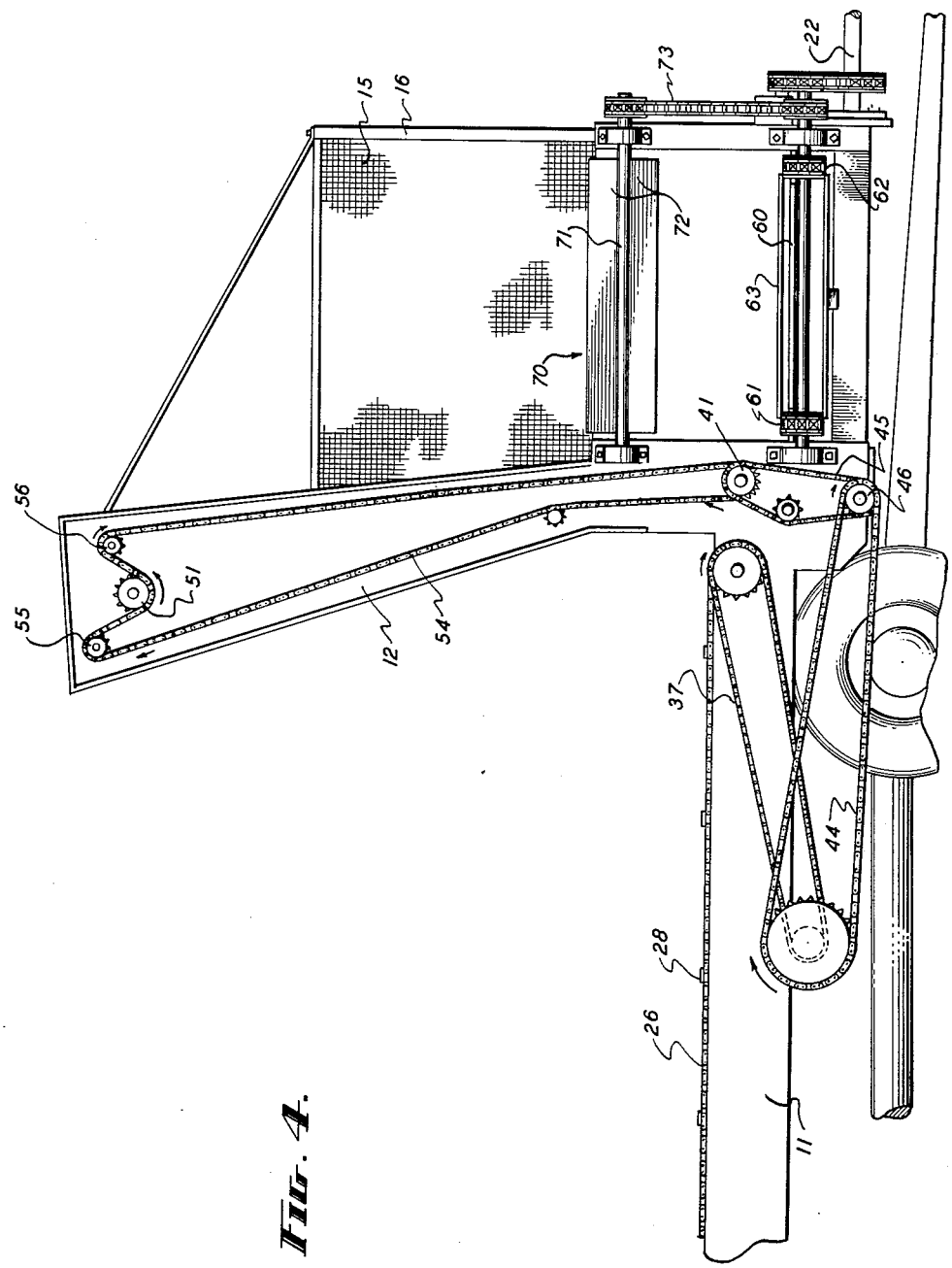
FIG. 4 is a side elevational view of a portion of the right side of the wagon of FIG. 1.

The longitudinal conveyor drive chains 26 and 27 are driven from the drive shaft 22 through a gear box 33 and chain drive linkage 34 coupled to a common shaft 35 mounted on the bottom (see FIG. 5) of the principal body portion 11. External chain linkages 37 and 38 couple the common shaft 35 to the front drive sprockets for the longitudinal conveyor drive chains 26 and 27, and thus provide the final direct linkage between the drive chains 26 and 27 and the drive shaft 22. Some details of this arrangement may also be seen in FIGS. 3 and 4.

The direction of movement of the conveyor bars 28 of the longitudinal conveyor is in the forward direction on the top side of the wagon bed 25. The drive shaft 22 has a counterclockwise direction of rotation, as viewed from the front of the wagon looking toward the rear (see FIG. 2). Accordingly, the necessary interchange of rotation to provide the desired movement for the endless drive chains 26, 27 is provided through the associated gearing and chain drive mechanisms.

Extending across the front end of the principal body portion 11, and journalled in the opposite sides thereof, is a lower beater device 40. The lower beater 40 consists of a shaft 41 extending transverse to the longitudinal direction of the longitudinal conveyor. A number of elongated rectangular paddles 42 (best seen in FIG. 1) extend radially from the shaft 41 along the principal portion of its length. The shaft 41 is approximately on the same plane as the top surface of the wagon bed 25, so that the paddles 42 rise above the wagon bed 25 as the shaft 41 rotates. The shaft 41 is given a clockwise rotation, as viewed from the right hand side of the wagon (as in FIG. 4). This clockwise rotation is achieved from the common shaft 35 through a pair of drive linkages 44 and 45 coupled through a double sprocket 46 to the shaft 41 of the lower beater device 40. Thus, as the paddles 42 rise above the level of the wagon bed 25 they are moving in the forward direction with respect to the wagon.

The arrangement also includes an upper beater device 50 extending between the vertical risers 12 (see FIG. 2 particularly). The upper beater device 50 includes a shaft rotatably mounted in the vertical risers 12 and extending transversely with respect to the longitudinal axis of the wagon. Extending radially from the shaft 51 is a group of curved arms or beater blades 52. The shaft 51 of the upper beater 50 is given a counterclockwise rotation, as viewed from the right hand side (see FIG. 4), through an endless chain drive 54 coupled on one end to the shaft 41 of the lower beater 40 and on the other end to the shaft 51 and to a pair of idlers 55 and 56 to give the desired direction of rotation. Consequently, as the beater blades 52 are moving in tht lower half of their cycle of rotation, they are moving in the forward direction with respect to the wagon.

The auxiliary, transverse conveyor mounted in the forward extension 13 of the main body frame 10 is similar in general form to the longitudinal conveyor, but smaller and effectively operating in a different direction. Specifically, the transverse conveyor includes an auxiliary bed 60 of rectangular form and elongated in a direction transverse to the wagon. The conveyor portion of the mechanism is formed by a pair of endless drive chains 61, 62, each running transverse to the wagon along a different long side of the auxiliary bed 60. The endless chains 61, 62 thus run from the left hand side of the wagon to the discharge side, and register with sprockets at each end of the auxiliary bed 60. Auxiliary conveyor bars 63 extending normal to the chains 61, 62 are provided at relatively equal spacings along the chains 61, 62. The auxiliary conveyor bars 63 may be coupled to the chains 61, 62 in a fashion similar to that illustrated for the principal conveyor bars 28 and the associated chains 26, 27. Thus, the auxiliary conveyor bars 63 traverse an endless path around the auxiliary bed 60. The bars 63 are more closely spaced than the like conveyor bars 28 on the wagon bed 25. Drive power for the auxiliary conveyor is provided from a chain 65 coupled through associated sprockets to the drive shaft 22 and to the shaft of the sprockets for the chains 61, 62 at the discharge end of the auxiliary conveyor. As may be seen in FIG. 1, the endless chain 65 imparts a movement to the transverse conveyor such that the auxiliary conveyor bars 63 are moving toward the discharge end when they are on the top side of the auxiliary bed 60.

A metering device 70 is positioned above the discharge end of the auxiliary conveyor. The metering device 70 includes a shaft rotatably mounted between one vertical riser 12 and the front panel 16 of the wagon. Extending radially from the shaft 71 may be several angularly disposed paddles 72 which are substantially coextensive with the longitudinal dimension along the wagon of the auxiliary bed 60. The metering device may best be seen in FIG. 4, while the drive for this arrangement is best seen in FIG. 2. As seen therein, an endless chain drive 73 couples sprockets on the shaft at the discharge end of the auxiliary conveyor to the shaft 71 of the metering device 70. The rotation imparted from the drive shaft 22 results in a counterclockwise rotation of the metering device shaft 71. Thus, as the paddles 72 rotate, in the lower half of their cycle of rotation, they oppose the direction of movement of the auxiliary conveyor bars 63.

In operation, referring now to the drawings and particularly to the simplified perspective of FIG. 7, the device provides continuous movement, in synchronization, of the various operative parts as the wagon moves in a forward direction along its longiutdinal axis. To recount these various movements, the drive shaft 22 rotates continuously as the wagon moves, under power from the associated motive power source (not shown). The conveyor bars 28 on the wagon bed 25 move continuously toward the front of the wagon and they pass across the top surface of the wagon bed 25. The upper beater 50 and the lower beater 40 rotate continuously. Similarly, the auxiliary conveyor bars 63 on the transverse conveyor move continuously toward the discharge end as they pass across the top surface of the auxiliary bed 60. The metering device 70 likewise rotates continuously.

It may now be seen that during the loading operation the wagon may be loaded with a number of fodder bales 20 (best seen in FIG. 3). During the loading operation the drive shaft 22 may or may not be rotating the associated members, although it is preferable to load with the members stationary. Thereafter, however, the wagon may be pulled along by the tongue 19 and with the drive shaft 22 driven, the desired feeding distribution is automatically attained. As seen in FIG. 3, two fodder bales 20 may be stacked vertically at each position along the length of the principal body portion 11, thus effectively doubling the capacity of the wagon.

As the longitudinal conveyor bars 28 move toward the front of the wagon bed 25, they provide a gripping action against the under sides of the bottom bales, and accordingly carry the bales 20 toward the front of the principal body 11. The bales 20 slide forward smoothly, because of the presence of the longiutdinal rails 31 with which the conveyor bars 28 make frictional contact. The presence of the rails 31 further reduces the amount of driving power needed for the longitudinal conveyor. The fodder bales 20 therefore move slowly but continuously toward the front of the wagon bed as the operation progresses. As the bales 20 reach the vertical risers 12, however, the breaking and shredding operation takes place. The bales 20 must in effect pass between the beaters 40 and 50, and in so doing the bales 20 are broken from their substantially solid form. The blades 52 of the upper beater may be considered to take separate cuts from the uppermost ones of the bales 20. It has been found that the number of blades 52 shown will operate adequately, because each blade 52 gouges or tears out more of the fodder than is in its path of movement. Note also that the blades 52 are moving forward as they reach the downward portion of their circular movement. Therefore, the blades serve to eject the shredded fodder toward the transverse conveyor, and to throw the shredded fodder toward screens 15 and 16 and thence down onto the auxiliary bed 60.

Similarly, the lower beater 40 rotates in a sense to direct shredded fodder toward the front of the wagon. Here the beating and shredding action is augmented by the weight of the bales 20, which rest down upon the lower beater as it rotates. The paddles 42 of the lower beater 40 consequently tear away succeeding portions of the fodder bales 20, and eject these onto the auxiliary bed 60 of the transverse conveyor. The result is that very few pieces of large size pass on to the transverse conveyor. Those which do are treated in a manner described below.

As the longitudinal conveyor operates, therefore, shredded fodder and small pieces of fodder are thrown onto the transverse conveyor. Accumulation is avoided because of the movement of the transverse conveyor bars 63 toward the discharge end of the wagon. The transverse conveyor bars 63 carry the shredded fodder toward the discharge end and deposit it on the ground free of the wheels 18 on the right hand side of the wagon.

This action is continuous and at a rate determined by the amount of fodder passing through the beaters 40 and 50. A greater amount may tend to collect intermittently on the transverse conveyor, however, and for the purpose of maintaining the flow substantially constant there is provided the metering device 70. The metering device 70 rotates at a height relative to the auxiliary bed 60 which is determined in accordance with the maximum amount of fodder it is desired to discharge. The paddles 72 of the metering device 70 effectively oppose the passage of higher levels and larger pieces of fodder by beating the fodder back toward the opposite end of the transverse conveyor. Momentary accumulations of fodder are thus redistributed, and the rate of discharge from the discharge end of the auxiliary bed 60 remains substantially constant at the selected level.

In consequence, with the wagon moving at a substantially constant rate of speed, and with all of the operative elements rotating synchronously with the drive shaft 22, there is a straight and relatively level distribution of shredded fodder upon the ground, as desired.

The advantages of this arrangement may now readily be seen. The rate of distribution of the fodder may be controlled either by controlling the speed of the wagon, or the speed of the drive shaft 22, or by usng a combination of both. In any event, the exercise of control is extremely simple, because of the synchronous operation from the drive shaft 22. The longitudinal conveyor serves as a platform for the fodder which is extremely easy to load and which has high capacity. Further, however, the fodder is very readily provided to the front of the wagon and in a manner so that the beaters can operate upon it most effectively. The product ejected from the beaters is retained on the wagon substantially without waste through the use of the auxiliary transverse conveyor and the associated screens. Discharge from the wagon is at a controlled rate and at the selected point, and is maintained substantially uniform both by the nature of the previous feed and beating arrangement and through the use of the metering device. The individual component parts which are employed are of relatively simple construction, inexpensive to fabricate, and extremely rugged.

Although a particular arrangement of a fodder distributing wagon has been illustrated in the drawings and described in detail above, it will be appreciated that the invention is not limited thereto. Accordingly, any modifications, variations or equivalent arrangements falling within the scope of the annexed claims should be considered to be a part of the invention.

What is claimed is:

1. A feeding wagon for discharging measured amounts of livestock fodder secured from stacked bales of fodder including the combination of a wagon bed for supporting stacked bales of fodder, a longitudinal conveyor for transporting the bales of fodder along the length of the wagon, a pair of vertically spaced beaters adapted to rotate in opposite directions mounted adjacent the forward end of the wagon bed for breaking into pieces the bales transported by the longitudinal conveyor, an auxiliary bed mounted at the forward end of the wagon bed to receive fodder from the beaters, a transverse conveyor mounted on the auxiliary bed and adapted to transport the pieces of fodder on the auxiliary bed to one side of the wagon for discharge, a rotatable metering device mounted above the discharge end of the transverse conveyor, said metering device including paddles which are rotatable in a direction to oppose the passage of high levels and large pieces of fodder by urging the fodder back toward the opposite end of the transverse conveyor for limiting the discharge of fodder to a predetermined maximum amount, a drive shaft, and a plurality of linkages connecting the drive shaft, the longitudinal conveyor, the beaters, the transverse conveyor and the metering device, whereby each of the above mentioned elements may be driven synchronously by rotation of the drive shaft.

2. A feeding wagon for discharging measured amounts of livestock fodder secured from stacked bales of fodder including the combination of a wagon bed for supporting stacked bales of fodder, a pair of endless conveyor drive chains supported along opposite sides of the wagon bed, a plurality of conveyor bars attached to the drive chains extending transversely across the bed of the wagon at equal longitudinal distances for transporting stacked bales of fodder in a forward direction, a pair of vertically spaced beaters adapted to rotate in opposite directions mounted adjacent the forward end of the wagon bed for breaking into pieces the bales transported by the conveyor bars, an auxiliary bed mounted at the forward end of the wagon bed to receive fodder from the beaters, a second pair of endless conveyor drive chains mounted on opposite sides of the auxiliary drive bed transversely of the wagon bed, a plurality of transverse conveyor bars mounted between the second conveyor chains extending transversely of the auxiliary bed and longitudinally of the wagon bed, said transverse conveyor bars being adapted to transport the pieces of fodder on the auxiliary bed to one side of the wagon for discharge, a rotatable metering device mounted above the discharge end of the transverse conveyor, said metering device including paddles which are rotatable in a direction to oppose the passage of high levels and large pieces of fodder by urging the fodder back toward the opposite end of the transverse conveyor for limiting the discharge of fodder to a pre-determined maximum amount, a drive shaft, and a plurality of linkages connecting the drive shaft, the first pair of conveyor drive chains, the beaters, the second pair of conveyor drive chains and the metering device, whereby each of the above mentioned elements may be driven synchronously by rotation of the drive shaft.

References Cited in the file of this patent

UNITED STATES PATENTS

| 2,489,594 | Sherman | Nov. 29, 1949 |
|---|---|---|
| 2,676,002 | Wolfe | Apr. 20, 1954 |
| 2,694,499 | Mohrlang | Nov. 16, 1954 |
| 2,702,711 | Purcell | Feb. 22, 1955 |
| 2,711,902 | Martin | June 28, 1955 |
| 2,715,972 | Grygiel | Aug. 23, 1955 |
| 2,771,203 | Collins | Nov. 20, 1956 |
| 2,772,796 | Hansen | Dec. 4, 1956 |

FOREIGN PATENTS

| 449,392 | Germany | Sept. 16, 1927 |
|---|---|---|
| 721,574 | Great Britain | Jan. 5, 1955 |